(12) United States Patent
Okazaki et al.

(10) Patent No.: US 7,936,433 B2
(45) Date of Patent: May 3, 2011

(54) LIQUID CRYSTAL DISPLAY DEVICE

(75) Inventors: Kengo Okazaki, Mobara (JP); Hideaki Ishige, Sanbu (JP); Hitoshi Komeno, Mobara (JP); Toshiyuki Koshita, Chosei (JP)

(73) Assignee: Hitachi Displays, Ltd., Chiba (JP)

( * ) Notice: Subject to any disclaimer, the term of this patent is extended or adjusted under 35 U.S.C. 154(b) by 370 days.

(21) Appl. No.: 12/292,506

(22) Filed: Nov. 20, 2008

(65) Prior Publication Data

US 2009/0244422 A1 Oct. 1, 2009

(30) Foreign Application Priority Data

Mar. 28, 2008 (JP) ................................. 2008-087278

(51) Int. Cl.
*G02F 1/1339* (2006.01)
(52) U.S. Cl. ............ 349/153; 349/155; 349/42; 349/122
(58) Field of Classification Search .................. 349/153, 349/41, 42, 56, 91, 122, 111, 149, 154, 155, 349/190; 438/30
See application file for complete search history.

(56) References Cited

U.S. PATENT DOCUMENTS

| 7,038,751 | B2 * | 5/2006 | Lee | 349/139 |
| 2004/0252270 | A1 * | 12/2004 | Lee | 349/153 |
| 2008/0007686 | A1 * | 1/2008 | Chen et al. | 349/153 |
| 2009/0244422 | A1 * | 10/2009 | Okazaki et al. | 349/42 |

FOREIGN PATENT DOCUMENTS

JP 2001-21909 7/1999

\* cited by examiner

*Primary Examiner* — Brian M Healy
(74) *Attorney, Agent, or Firm* — Stites & Harbison PLLC; Juan Carlos A. Marquez, Esq.

(57) ABSTRACT

Disclosed is a liquid crystal display device that is capable of preventing a conductive paste for connecting a common wiring line of a TFT substrate and a counter electrode of a counter substrate from flowing outward. A sealant is formed outside a display region of a liquid crystal display device. A conductive paste for connecting a common wiring line of a TFT substrate and a counter electrode of a counter substrate is provided at a corner of the liquid crystal display device outside the sealant. An L-shaped stopper is formed on the counter substrate so as to prevent the conductive paste from flowing outward. With the stopper, even if the width of a frame is equal to or less than 1.5 mm, it is possible to prevent the conductive paste from flowing outward.

14 Claims, 14 Drawing Sheets

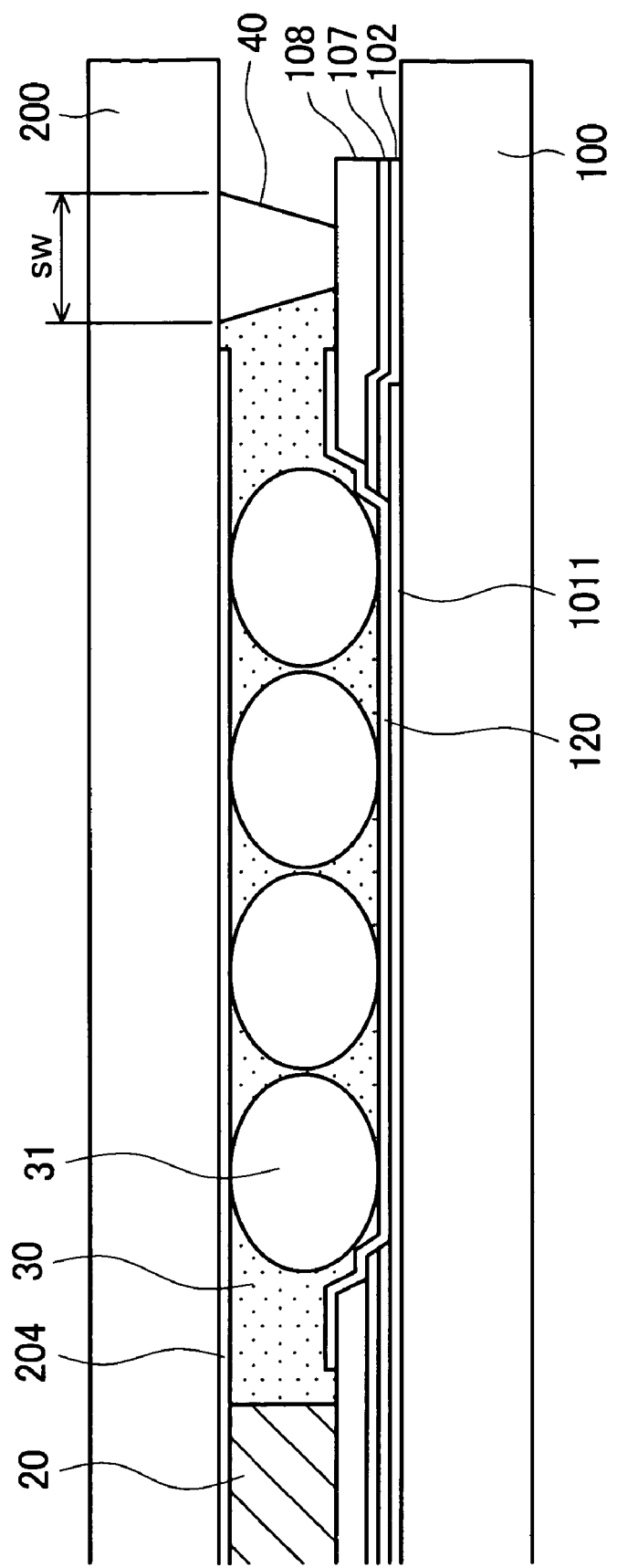

LIQUID CRYSTAL DISPLAY DEVICE

The present application claims priority from Japanese application JP2008-87278 filed on Mar. 28, 2008, the content of which is hereby incorporated by reference into this application.

BACKGROUND OF THE INVENTION

1. Field of the Invention

The present invention relates to a display device, and in particular, to a small flat-panel display device that has a large display region with respect to a small overall size.

2. Description of the Related Art

In view of flat and lightweight, liquid crystal displays or organic EL displays are used for various purposes in various fields. In mobile phones or DSCs (Digital Still Camera), small liquid crystal displays or organic EL displays are widely used. These display devices need to have an overall size as small as possible. Meanwhile, in terms of ease of viewing, a display region is preferably sufficiently large. Therefore, there is a need for a display device that has a small overall size but a large display region.

A liquid crystal display has a TFT substrate, on which pixels each having a pixel electrode and a thin film transistor (TFT) are arranged in a matrix, a counter substrate that is opposed to the TFT substrate and has formed thereon color filters, and a liquid crystal layer that is interposed between the two substrates. The liquid crystal layer is sealed by a sealant, which is formed at the periphery between the TFT substrate and the counter substrate. The counter substrate has a counter electrode, which is formed to be opposed to the pixel electrodes of the TFT substrate. An image signal is applied between the pixel electrodes and the counter electrode, and transmitted light from a backlight or reflected light of external light is controlled for each pixel, thereby forming an image.

A common voltage is applied to the counter electrode of the counter substrate. The common voltage is supplied to a terminal portion of the TFT substrate, and is then supplied to the counter electrode of the counter substrate through a common wiring line of the TFT substrate. Accordingly, it is necessary to electrically connect the common wiring line of the TFT substrate and the counter electrode of the counter substrate. The electrical connection of the common wiring line of the TFT substrate and the counter electrode of the counter substrate is made by forming a conductive paste between the TFT substrate and the counter substrate. For example, a conductive paste, in which conductive beads are dispersed in a resin paste, is used. JP-A-2001-21909 discloses a technology that electrically connects the TFT substrate and the counter substrate by the conductive paste containing conductive beads.

SUMMARY OF THE INVENTION

If a display region 10 increases with a small overall size unchanged, a frame portion (also referred to as a frame or a frame region) has a small width. In the frame portion, scanning-line lead lines for supplying scanning signals to the pixels, and image-signal-line lead lines for supplying image signals are provided. If the frame portion becomes small, it is difficult to ensure a sufficient space for the scanning-line lead lines. Meanwhile, in the frame portion, a sealant 20 for bonding a TFT substrate 100 and a counter substrate 200 needs to be formed. To reliably seal between the TFT substrate 100 and the counter substrate 200, the sealant 20 needs to be formed to have a predetermined width or more. In the frame portion, a conductive paste for connecting a common wiring line of the TFT substrate 100 and counter electrode of the counter substrate 200 is also formed. Accordingly, if the frame portion becomes small, there is a problem in that a space for the scanning-line lead lines, the sealant, and the conductive paste become small.

FIG. 15 is a plan view of a liquid crystal display, which is used in a mobile phone. Referring to FIG. 15, the counter substrate 200 is provided above the TFT substrate 100. A liquid crystal layer is interposed between the TFT substrate 100 and the counter substrate 200. The TFT substrate 100 and the counter substrate 200 are bonded to each other by the sealant 20 in the frame portion. The TFT substrate 100 is larger than the counter substrate 200. In a portion of the TFT substrate 100, excluding a portion overlapping the counter substrate 200, a terminal portion 150 for supplying power, image signals, and scanning signals to the liquid crystal display are formed. An IC driver 50 for driving scanning lines and image signal lines is also provided in the terminal portion 150.

Referring to FIG. 15, the liquid crystal display has a vertical length LY of 81 mm, and a horizontal length LX of 54 mm. The terminal portion 150, in which the IC driver 50 is mounted, has a width T of 2.7 mm. A width T between the display region 10 and an end of the TFT substrate 100 or the counter substrate 200, that is, the width of the frame portion is d1. If the width d1 of the frame portion is, for example, equal to or less than 1.5 mm, the following problems may occur.

In the frame portion, the scanning-line lead lines (not shown), the sealant, and a conductive paste 30, which connects the common wiring line of the TFT substrate 100 and the counter electrode of the counter substrate 200 are provided. In FIG. 15, when a distance d1 between an end of the display region 10 and an end of the counter substrate 200 is set to 1.5 mm, the width w of the sealant 20 is, for example, 0.6 mm, a distance d2 between the end of the display region 10 and an end of the sealant 20 is 0.4 mm, and a distance d3 between the other end of the sealant 20 and the end of the counter substrate 200 is 0.5 mm.

The conductive paste 30, which electrically connects the TFT substrate 100 and the counter substrate 200, is provided at a corner, as shown in FIG. 15. This is because the corner spatially affords. The conductive paste 30 is provided outside the sealant 20. The conductive paste 30 is dropped down and is then crushed on the counter substrate 200 through nozzles and spread when the TFT substrate 100 and the counter substrate 200 are bonded to each other. If the frame has a small area, a space for the conductive paste 30 is limited, and accordingly the conductive paste 30 may spread beyond the end of the counter substrate 200.

The liquid crystal display shown in FIG. 15 is plurally formed in large mother substrate, and is separated along a cutting line. As shown in FIG. 15, if the conductive paste 30 spreads, defective cutting may occur when each liquid crystal display is separated from them other substrate. For this reason, it is necessary to prevent the conductive paste 30 from spreading outside a predetermined region. Although FIG. 15 shows a case where the width d1 of the frame is 1.5 mm, the width d1 may be smaller than 1.5 mm, and the spread of the conductive paste 30 may become worse. An object of the invention is to solve the above-described problems.

The invention has been finalized in order to achieve the above-described object, and may be embodied as the following aspects.

(1) According to a first aspect of the invention, a liquid crystal display device includes a TFT substrate that has a common wiring line for supplying a common voltage, a counter substrate that has a counter electrode, to which the common voltage is supplied, a sealant that bonds the TFT substrate and the counter substrate to each other, and liquid crystal that is sealed between the TFT substrate, the counter substrate, and the sealant. The counter substrate has a display region and a frame region, and a width of the frame region is defined by a distance from a side determining an end of the display region to an end of the counter substrate. The common wiring line of the TFT substrate and the counter electrode of the counter substrate are electrically connected by a conductive paste, the conductive paste is formed outside the sealant, and a stopper is formed on the counter substrate outside the conductive paste to prevent the conductive paste from flowing outward.

(2) According to a second aspect of the invention, in the liquid crystal display device according to the first aspect of the invention, the stopper may be provided at two corners of the counter substrate.

(3) According to a third aspect of the invention, in the liquid crystal display device according to the first or second aspect of the invention, the stopper may have an L shape.

(4) According to a fourth aspect of the invention, in the liquid crystal display device according to any one of the first to third aspects of the invention, the sealant may be made of epoxy resin, and the conductive paste may be formed by conductive beads in epoxy resin.

(5) According to a fifth aspect of the invention, in the liquid crystal display device according to any one of the first to fourth aspects of the invention, the width of the frame region may be equal to or less than 1.5 mm.

(6) According to a sixth aspect of the invention, a liquid crystal display device includes a TFT substrate that has a common wiring line for supplying a common voltage, a counter substrate that has a counter electrode, to which the common voltage is supplied, a sealant that bonds the TFT substrate and the counter substrate to each other, and liquid crystal that is sealed between the TFT substrate, the counter substrate, and the sealant. The counter substrate has a display region and a frame region, and a width of the frame region is defined by a distance from a side determining an end of the display region to an end of the counter substrate. The counter substrate has long and short sides. The common wiring line of the TFT substrate and the counter electrode of the counter substrate are electrically connected by a conductive paste, the conductive paste is formed outside the sealant, and a stopper is formed on the counter substrate outside the conductive paste to prevent the conductive paste from flowing outward. The stopper has a first stopper that is provided along a long-side corner of the counter substrate, and a second stopper that is provided along a short-side corner of the counter substrate, and a gap between the first stopper and the second stopper is in a range of 100 μm to 5 μm.

(7) According to a seventh aspect of the invention, in the liquid crystal display device according to the sixth aspect of the invention, the gap between the first stopper and the second stopper may be in a range of 50 μm to 5 μm.

(8) According to an eighth aspect of the invention, in the liquid crystal display device according to the sixth or the seventh aspect of the invention, the first stopper and the second stopper may have a bar shape.

(9) According to a ninth aspect of the invention, in the liquid crystal display device according to any one of the sixth to eighth aspects of the invention, the stopper may be provided at two corners of the counter substrate to prevent the conductive paste from flowing outward.

(10) According to a tenth aspect of the invention, in the liquid crystal display device according to any one of the sixth to ninth aspects of the invention, the width of the frame region may be equal to or less than 1.5 mm.

(11) According to an eleventh aspect of the invention, a liquid crystal display device includes a TFT substrate that has a common wiring line for supplying a common voltage, a counter substrate that has a counter electrode, to which the common voltage is supplied, a sealant that bonds the TFT substrate and the counter substrate to each other, and liquid crystal that is sealed between the TFT substrate, the counter substrate, and the sealant. The counter substrate has a display region and a frame region, and a width of the frame region is defined by a distance from a side determining an end of the display region to an end of the counter substrate. In the display region, a columnar spacer is formed on the counter substrate to define a gap between the TFT substrate and the counter substrate. The common wiring line of the TFT substrate and the counter electrode of the counter substrate are electrically connected by a conductive paste, the conductive paste is formed outside the sealant, and a stopper is formed on the counter substrate outside the conductive paste to prevent the conductive paste from flowing outward. The stopper and the columnar spacer are made of the same material.

(12) According to a twelfth aspect of the invention, in the liquid crystal display device according to the eleventh aspect of the invention, the stopper and the columnar spacer may be formed by the same process.

(13) According to a thirteenth aspect of the invention, in the liquid crystal display device according to the eleventh or twelfth aspect of the invention, the stopper and the columnar spacer may have the same height.

(14) According to a fourteenth aspect of the invention, in the liquid crystal display device according to any one of the eleventh to thirteenth aspects of the invention, the width of the frame region may be equal to or less than 1.5 mm.

According to the aspects of the invention, in regards to a conductive paste for electrically connecting a common wiring line of a TFT substrate and a counter electrode of a counter substrate, a stopper is formed so as to prevent the conductive paste from flowing outward. For this reason, it is possible to retain the conductive paste within a predetermined region. Therefore, it is possible to cope with various problems caused by the flowing-out of the conductive paste. In particular, it is possible to suppress irregular defects of glass when being separated due to the flowing-out of the conductive paste when a liquid crystal display panel is separated from a mother substrate.

According to another aspect of the invention, a stopper for preventing a conductive paste from flowing outward is formed simultaneously with a columnar spacer, which is formed in a display region to define a gap between a TFT substrate and a counter substrate. As a result, it is possible to reliably prevent the conductive paste from flowing outward without causing an increase in the number of steps of forming the stopper and an increase in costs.

BRIEF DESCRIPTION OF THE DRAWINGS

FIG. 4 is a sectional view of a corner.

DESCRIPTION OF PREFERRED EMBODIMENTS

The invention will be described in detail in connection with the following embodiments.

First Embodiment

Figure 1:
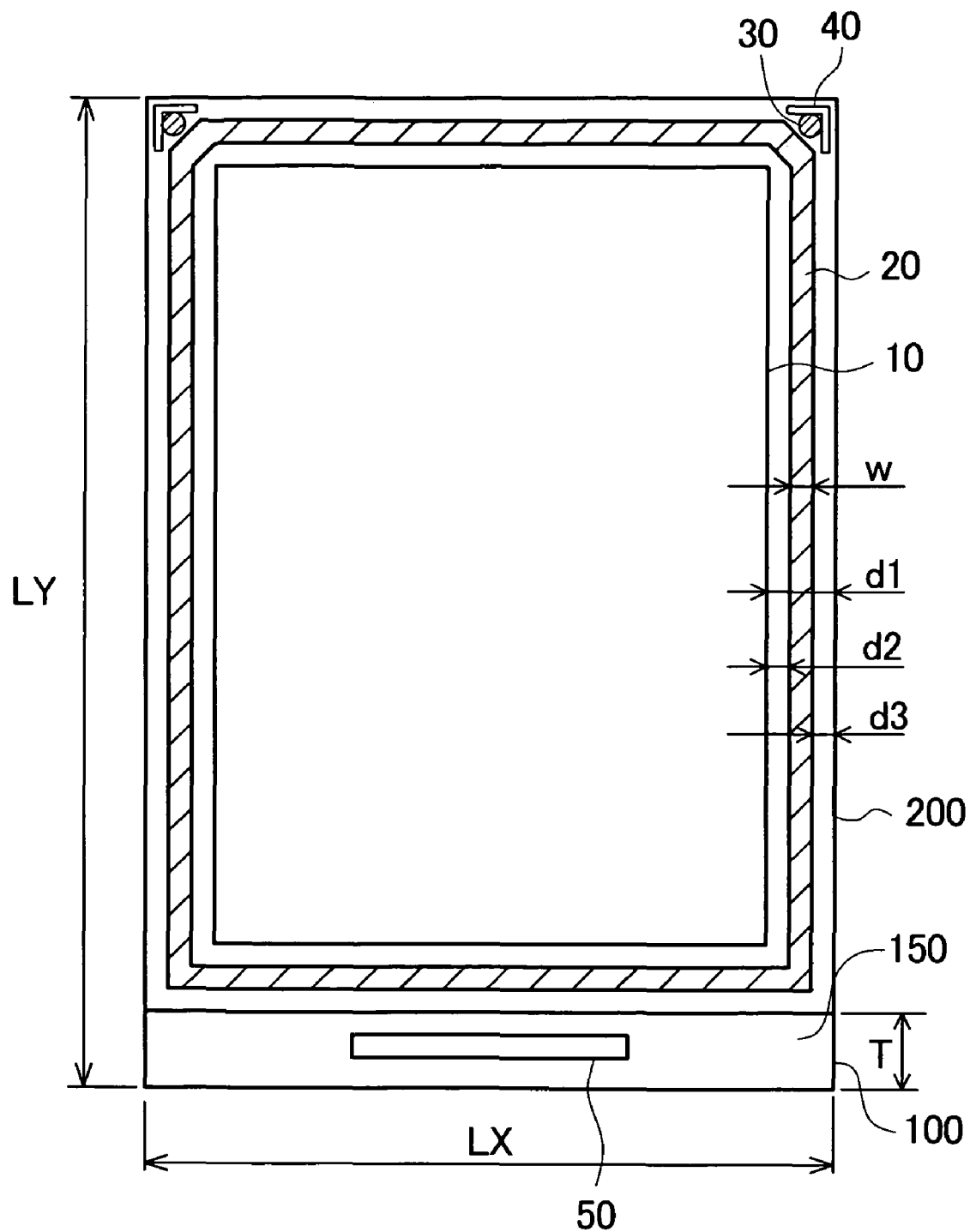
FIG. 1 is a plan view of a liquid crystal display according to a first embodiment of the invention.
Figure 15:
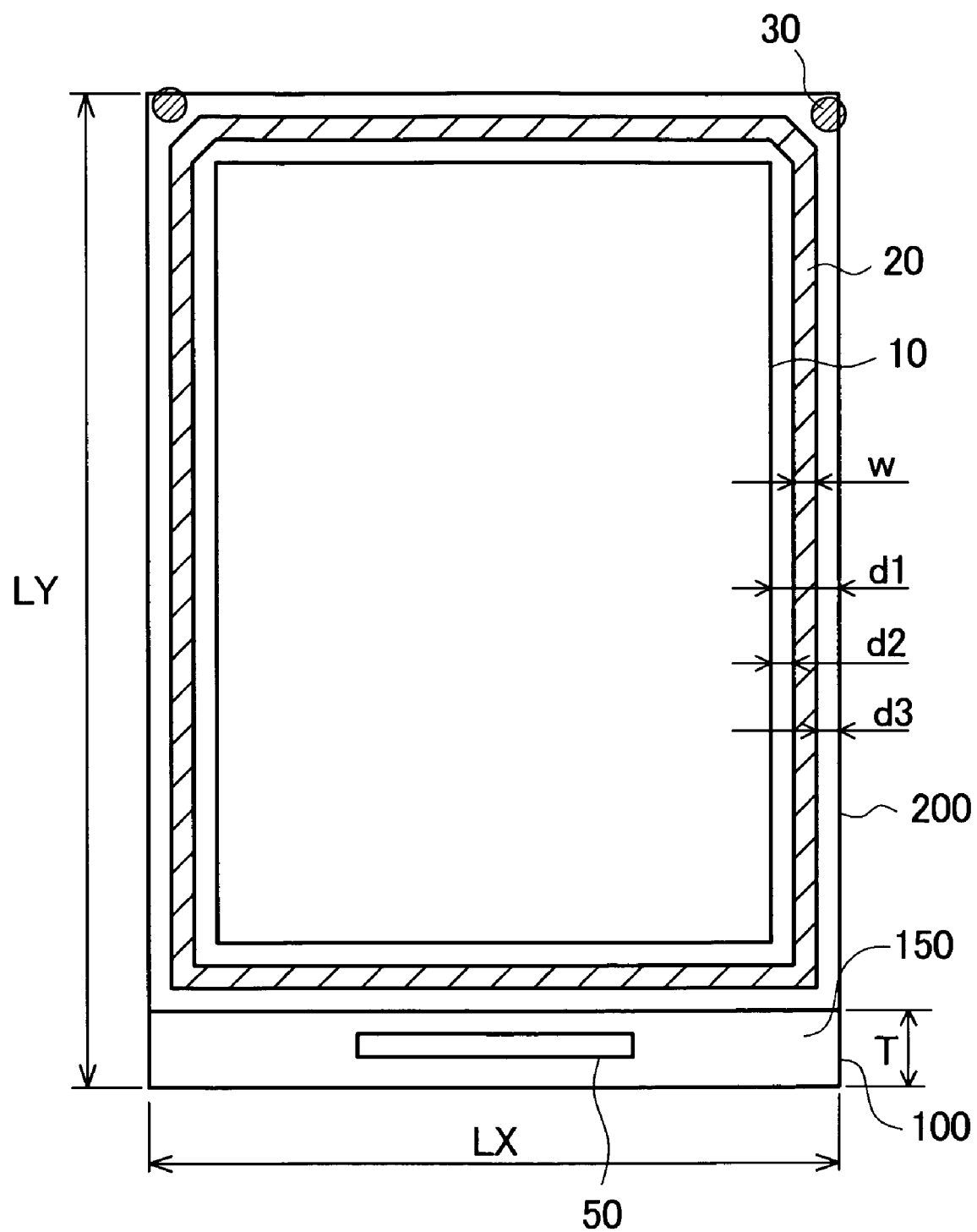
FIG. 15 is a plan view of a known liquid crystal display.

FIG. 1 shows a liquid crystal display for a mobile phone, to which the invention is applied. In FIG. 1, a TFT substrate 100, a counter substrate 200, a liquid crystal layer 300, a terminal portion 150, an IC driver 50, and a sealant 20 are provided at the same positions as those of the liquid crystal display shown in FIG. 15. The liquid crystal display shown in FIG. 1 has the same external shape as described with reference to FIG. 15. That is, the liquid crystal display shown in FIG. 1 has a vertical length LY of 81 mm and a horizontal length LX of 54 mm, and the terminal portion 150 in which the IC driver 50 is mounted has a width T of 2.7 mm. A width between a display region 10 and an end of the TFT substrate 100 or the counter substrate 200, that is, the width d1 of a frame portion is, for example, 1.5 mm. The invention may be applied even though the width d1 is less than 1.5 mm. Hereinafter, a case where the width d1 of the frame portion is 1.5 mm will be described.

In FIG. 1, the width w of the sealant 20 is 0.6 mm, a distance d2 between an end of the display region 10 and an end of the sealant 20 is 0.4 mm, and a distance d3 between the other end of the sealant 20 and an end of the counter substrate 200 is 0.5 mm. In this embodiment, since liquid crystal is dropped down on the counter substrate 200 by dropping, in FIG. 1, the sealant 20 is continuously provided all around. When liquid crystal is injected through an injection hole, the injection hole is formed by partially cutting the sealant 20.

A common voltage is applied to a counter electrode 204 of the counter substrate 200, such that an electric field is formed between the counter electrode 204 and a pixel electrode 110 in each pixel of the TFT substrate 100 to control liquid crystal molecules. The common voltage is supplied from the outside through a common terminal and a common wiring line 1011 connected to the common terminal, which are formed on the TFT substrate 100.

For electrical connection between the common wiring line 1011 formed on the TFT substrate 100 and the counter electrode 204 formed on the counter substrate 200, as shown in FIG. 1, conductive pastes 30 are provided at corners. This is because the corners spatially afford for the conductive pastes 30. At lower corners of the counter substrate 200 shown in FIG. 1, wiring lines are closely spaced, and accordingly a sufficient space for the conductive pastes 30 may not be ensured.

In a liquid crystal display, to which the invention is applied, the width d1 of the frame portion is small, and thus a sufficient space for the conductive pastes 30 is not ensured. For this reason, as described above, the conductive paste 30 may flow out of a predetermined region. In the liquid crystal display, the frame portion is formed in both the TFT substrate 100 and the counter substrate 200, but for clear definition, it is assumed that a dimension from the display region 10 is defined as the dimension of the frame portion in the counter substrate 200. In this embodiment, as shown in FIG. 1, an L-shaped stopper 40 is provided at the corner at which each conductive paste 30 is provided, to thereby prevent the conductive paste 30 from flowing out of a specific region.

Figure 2:
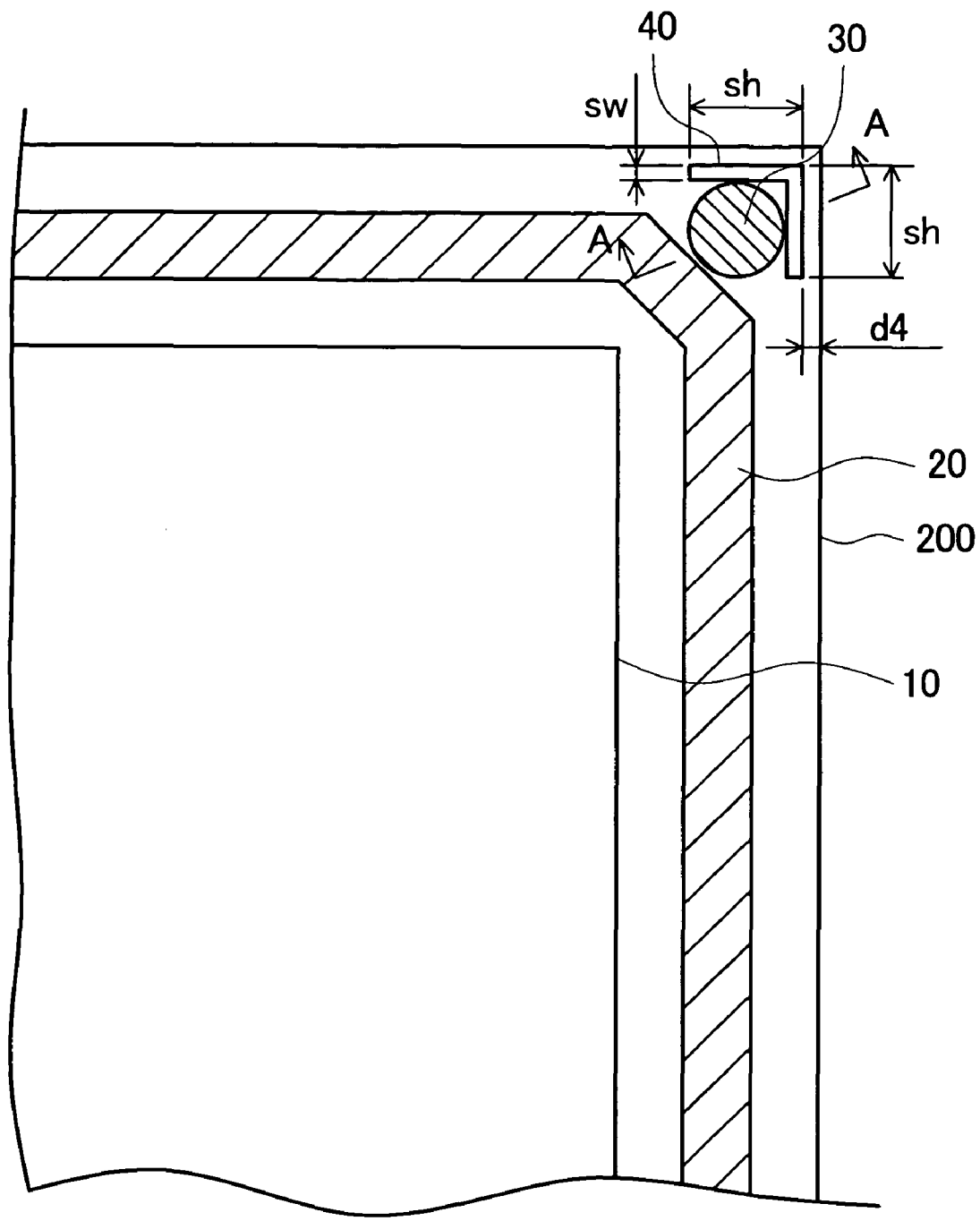
FIG. 2 is an enlarged plan view of a corner shown in FIG. 1.

FIG. 2 is an enlarged plan view of a corner, at which the conductive paste 30 is provided, in FIG. 1. Specifically, FIG. 2 is a perspective view showing the state of a corner in a state where the TFT substrate 100 and the counter substrate 200 are superimposed on each other. Referring to FIG. 2, the L-shaped stopper 40 is provided at the corner. The conductive paste 30 is dropped down inside the stopper 40. The conductive paste 30 is a liquid having high viscosity. At the corner, the sealant 20 is chamfered in order to ensure a space for the conductive paste 30.

As described below, the L-shaped stopper 40, the conductive paste 30, and the sealant 20 are initially provided on the counter substrate 200, and then the counter substrate 200 and the TFT substrate 100 are superimposed on each other. In FIG. 2, the sealant 20 is made of epoxy resin, and is formed on the counter substrate 200 by printing. The L-shaped stopper 40 is formed simultaneously with columnar spacers 205 for defining a gap between the counter substrate 200 and the TFT substrate 100 in the display region 10. The conductive paste 30 is formed by dispersing conductive beads 31 as described latter in the same epoxy-based resin as the sealant 20.

In FIG. 2, the L-shaped stopper 40 has a width sw of 10 μm and the length of a side thereof is 0.5 mm. The height of the L-shaped stopper 40 is the same as the columnar spacers 205 in the display region 10, that is, approximately 4 μm. That is, the L-shaped stopper 40 has an elongated shape. Even though the L-shaped stopper 40 is so elongated, it is possible to sufficiently achieve the effect of the stopper 40 for stopping the conductive paste 30.

A distance d4 between an outer end of the stopper 40 and an end of the counter substrate 200 is approximately 0.2 mm. The distance d4 is defined by accuracy of a scribing machine when each liquid crystal display panel is separated from a mother substrate. The stopper 40 enables to reliably prevent the conductive paste 30 from flowing out of a specific region. Thus, even though the width of the frame portion becomes small, it is possible to suppress defectives when a liquid crystal display panel is separated.

Figure 3:
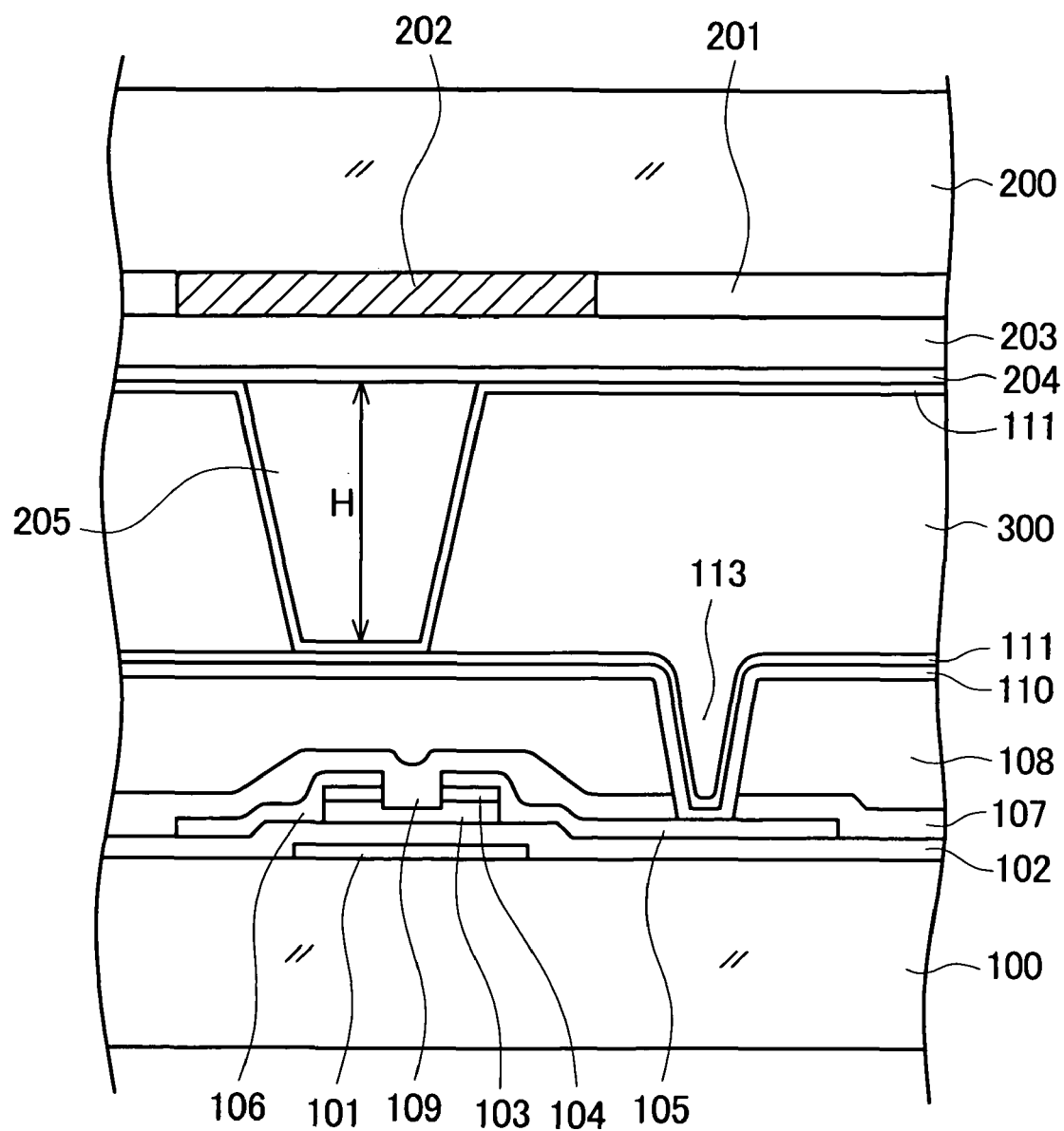
FIG. 3 is a sectional view of a display region.

FIG. 3 is a sectional view of the liquid crystal display in the display region 10. Referring to FIG. 3, a gate electrode 101 is formed on the TFT substrate 100. The gate electrode 101 is formed by sputtering and then patterned by photolithography. The gate electrode 101 is made of aluminum (Al), and has a thickness of approximately 300 nm. A scanning line is formed in the same layer as the gate electrode 101 at a time. The common wiring line 1011, which is formed on the TFT substrate 100 to supply the common voltage to the counter electrode 204 of the counter substrate 200, is also formed in the same layer as the gate electrode 101 at a time. A gate insulating layer 102 is formed to cover the gate electrode 101. The gate insulating layer 102 is formed by depositing a SiN film by a CVD method. The gate insulating layer 102 has a thickness of approximately 400 nm.

A semiconductor layer 103 is formed on the gate electrode 101 with the gate insulating layer 102 interposed therebetween. The semiconductor layer 103 is made of a-Si, and has a thickness of approximately 150 nm. A channel region of a TFT is formed in the a-Si layer. An n-doped (n+) Si layer 104 is formed before a source electrode 105 and a drain electrode 106 are formed in the a-Si layer. The n-doped (n+) Si layer is to form an ohmic contact between the a-Si layer 103 and the source electrode 105 or the drain electrode 106.

The source electrode 105 or the drain electrode 106 is formed on the n-doped (n+) Si layer 104. An image signal line is formed in the same layer as the source electrode 105 or the drain electrode 106. The source electrode 105 or the drain electrode 106 is made of molybdenum (Mo) or aluminum (Al). When source electrode 105 or the drain electrode 106 is made of Al, it is covered with Mo on both sides. This is to prevent contact resistance from being unstable when Al comes into contact with ITO in a contact hole 113.

After the source electrode 105 or the drain electrode 106 is formed, channel etching is executed with the source electrode 105 and the drain electrode 106 as a mask. Etching is executed to an upper part of the a-Si layer in order to completely remove the n-doped (n+) Si layer 104 from the channel layer, thereby forming a channel etching region 109. Thereafter, an inorganic passivation layer 107 is formed to cover the entire TFT. The inorganic passivation layer 107 is made of SiN. The inorganic passivation layer 107 has a thickness of approximately 400 nm, for example.

An organic passivation layer 108 is formed to cover the inorganic passivation layer 107. The organic passivation layer 108 functions as a planarization layer, and thus it is formed thick, for example, approximately 2 μm. The organic passivation layer 108 is made of acrylic resin. Specifically, the organic passivation layer 108 is made of photosensitive acrylic resin, such that patterning may be executed with no resist.

Therefore, a contact hole 113 is formed to pass through the organic passivation layer 108 and the inorganic passivation layer 107. This is to electrically connect the pixel electrode 110 made of ITO and the source electrode 105 of the TFT. The pixel electrode 110 made of ITO is formed on the organic passivation layer 108.

Referring to FIG. 3, an alignment layer 111 for aligning the liquid crystal molecules is formed on the pixel electrode 110. The liquid crystal layer 300 is interposed between the TFT substrate 100 and the counter substrate 200. The liquid crystal molecules of the liquid crystal layer 300 are initially aligned by the alignment layer 111 formed on the TFT substrate 100 and an alignment layer 111 formed on the counter substrate 200.

Referring to FIG. 3, a color filter 201 is formed inside the counter substrate 200. For each pixel, the color filter 201 of red, green, or blue is formed, thereby forming a color image. A black matrix (light-blocking layer) 202 is formed between the color filters 201 in order to improve contrast of an image. The black matrix 202 also serves as a light-blocking layer for the TFT to prevent a photocurrent from flowing in the TFT.

An overcoat layer 203 is formed to cover the color filter 201 and the black matrix 202. The color filter 201 and the black matrix 202 have an uneven surface, and the overcoat layer 203 planarizes the uneven surface. The counter electrode 204 made of a transparent conductive film, such as ITO, is formed on the overcoat layer 203. If a voltage is applied between the pixel electrode 110 in each pixel of the TFT substrate 100 and the counter electrode 204 of the counter substrate 200, the liquid crystal molecules are rotated to control transmitted light or reflected light, thereby forming an image.

The columnar spacer 205 is formed on the counter electrode 204 in order to define the gap between the counter substrate 200 and the TFT substrate 100. The columnar spacer 205 is formed in a portion where the black matrix 202 is formed so as not to transmit light from a backlight. This is because a portion of the columnar spacer 205 disturbs the alignment of liquid crystal, causes light leakage from the backlight, and deteriorates contrast.

The height H of the columnar spacer 205 is the same as the thickness of the liquid crystal layer 300, for example, 4 μm. The L-shaped stopper 40 shown in FIG. 2 is formed simultaneously with the columnar spacer 205. Therefore, the columnar spacer 205 and the L-shaped stopper 40 have the same height. In addition, the columnar space 205 and the L-shaped stopper 40 are made of the same material. The columnar spacer 205 is made of, for example, photosensitive acrylic resin. The acrylic resin is coated on the entire surface of the counter substrate 200. Then, if exposure is executed using a mask, only an exposed portion is insoluble in a developer, and thus only the exposed portion remains as the columnar spacer 205 (or the stopper 40). The use of the photosensitive resin ensures removal of a resist process and reduction in a process.

An alignment layer 111 is formed to cover the columnar spacer 205 and the counter electrode 204. The liquid crystal layer 300 is initially aligned by the alignment layer 111 on the TFT substrate 100 and the alignment layer 111 on the counter substrate 200. An electric field, which is formed between the pixel electrode 110 of the TFT substrate 100 and the counter electrode 204 of the counter substrate 200, is applied to the initially aligned liquid crystal molecules to rotate the liquid crystal molecules. In this way, light transmitting the liquid crystal layer 300 is controlled, thereby forming an image. In this embodiment, as described with reference to FIG. 1, liquid crystal is dropped down and filled by dropping.

FIG. 4 is a sectional view taken along the line A-A of FIG. 2. Referring to FIG. 4, the conductive paste 30 is provided between the sealant 20 and the L-shaped stopper 40. Conductive beads 31 are dispersed in the conductive paste 30. The conductive beads 31 ensure electrical connection between the common wiring line 1011 of the TFT substrate 100 and the counter electrode 204 of the counter substrate 200. The conductive paste 30 is made of the same epoxy resin as the sealant 20, and is curable on the same condition as the sealant 20.

Figure 5A:
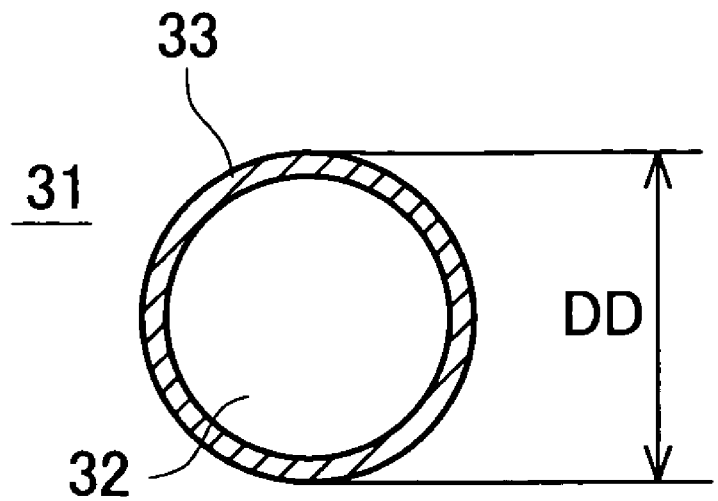
FIGS. 5A and 5B are sectional view of a conductive bead.
Figure 5B:
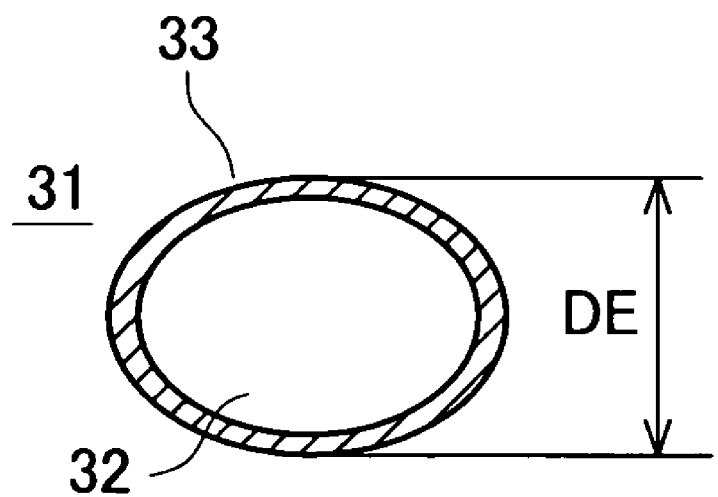

FIGS. 5A and 5B are schematic sectional views of a conductive bead 31. FIG. 5A shows a conductive bead 31 having a spherical shape. The conductive bead 31 is formed by coating a plastic bead 32 with a metal thin film, such as gold, and has conductivity due to the metal thin film (conductive coat 33). The conductive bead 31 shown in FIG. 5A has, for example, a diameter DD of 6 μm. If the conductive paste 30, in which the conductive beads 31 shown in FIG. 5A are dispersed, is provided on the counter substrate 200, and the TFT substrate 100 and the counter substrate 200 are bonded to each other, the conductive beads 31 are crushed and have the same shape as shown in FIG. 5B. A short diameter DE shown in FIG. 5B after the conductive bead 31 is crushed is, for example, 5 μm. As the conductive bead 31 is crushed, the conductive bead 31 comes into close contact with the common wiring line 1011 of the TFT substrate 100 and the counter electrode 204 of the counter substrate 200.

Returning to FIG. 4, the common wiring line 1011, which is formed in the same layer as the gate electrode 101, extends on the TFT substrate 100. The gate insulating layer 102, the inorganic passivation layer 107, and the organic passivation layer 108 are provided on the common wiring line 1011. In a portion where the common wiring line 1011 and the counter electrode 204 are electrically connected to each other, a contact hole is formed to pass through the gate insulating layer 102, the inorganic passivation layer 107, and the organic passivation layer 108, to thereby expose the common wiring line 1011.

The common wiring line 1011 is made of Al, and it may corrode when being exposed to an external environment. For this reason, the contact hole is covered with a chemically stable metal oxide conductive layer 120. The metal oxide conductive layer 120 is made of ITO. The metal oxide conductive layer 120 made of ITO is formed simultaneously with the pixel electrode 110 in the display region 10.

On the counter substrate 200, the counter electrode 204 made of ITO extends from the display region 10. The counter electrode 204 of the counter substrate 200 and the common wiring line 1011 of the TFT substrate 100 are connected to each other by the conductive beads 31. The stopper 40 is formed in order to prevent the conductive paste 30 having dispersed therein the conductive beads 31 from flowing beyond a cutting line of a liquid crystal display panel.

The stopper 40 is formed simultaneously with the columnar spacers 205 in the display region 10, and thus it has the same height as the columnar spacers 205. The stopper 40 is formed by depositing acrylic resin on the counter substrate 200 and executing exposure and development. Therefore, as shown in FIG. 4, the width of the stopper 40 on the counter substrate 200 is larger than the width of the stopper 40 on the TFT substrate 100. The width sw of the stopper 40 shown in FIG. 2 is the width of the stopper 40 on the counter substrate 200.

On the TFT substrate 100, the gate insulating layer 102, the inorganic passivation layer 107, and the organic passivation layer 108 are also formed in a portion where the stopper 40 is formed. The stopper 40 on the counter substrate 200 comes into contact with the organic passivation layer 108 on the TFT substrate 100 with no gap.

Figure 6:
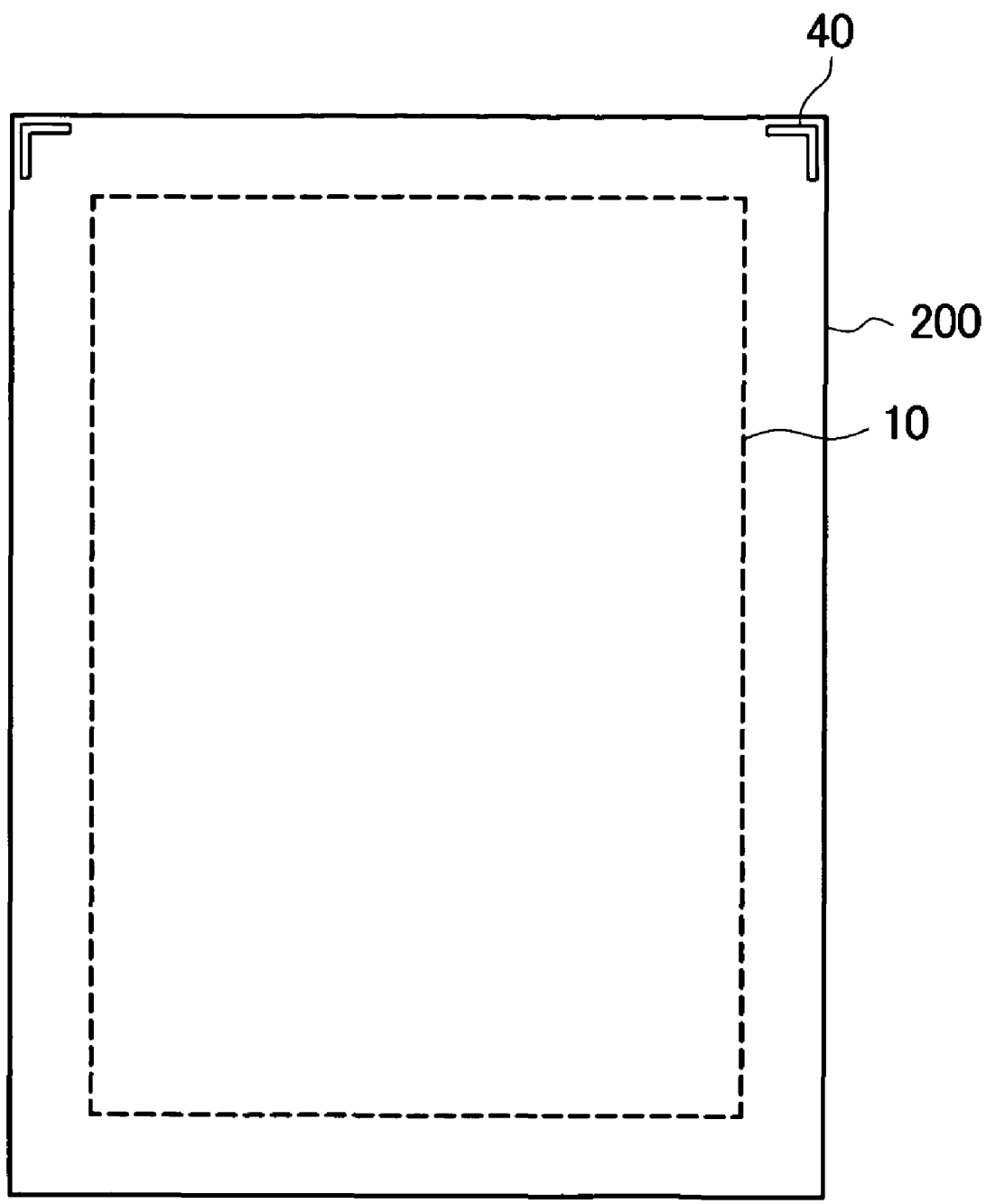
FIG. 6 is a plan view showing a case where a stopper is provided on a counter substrate.
Figure 7:
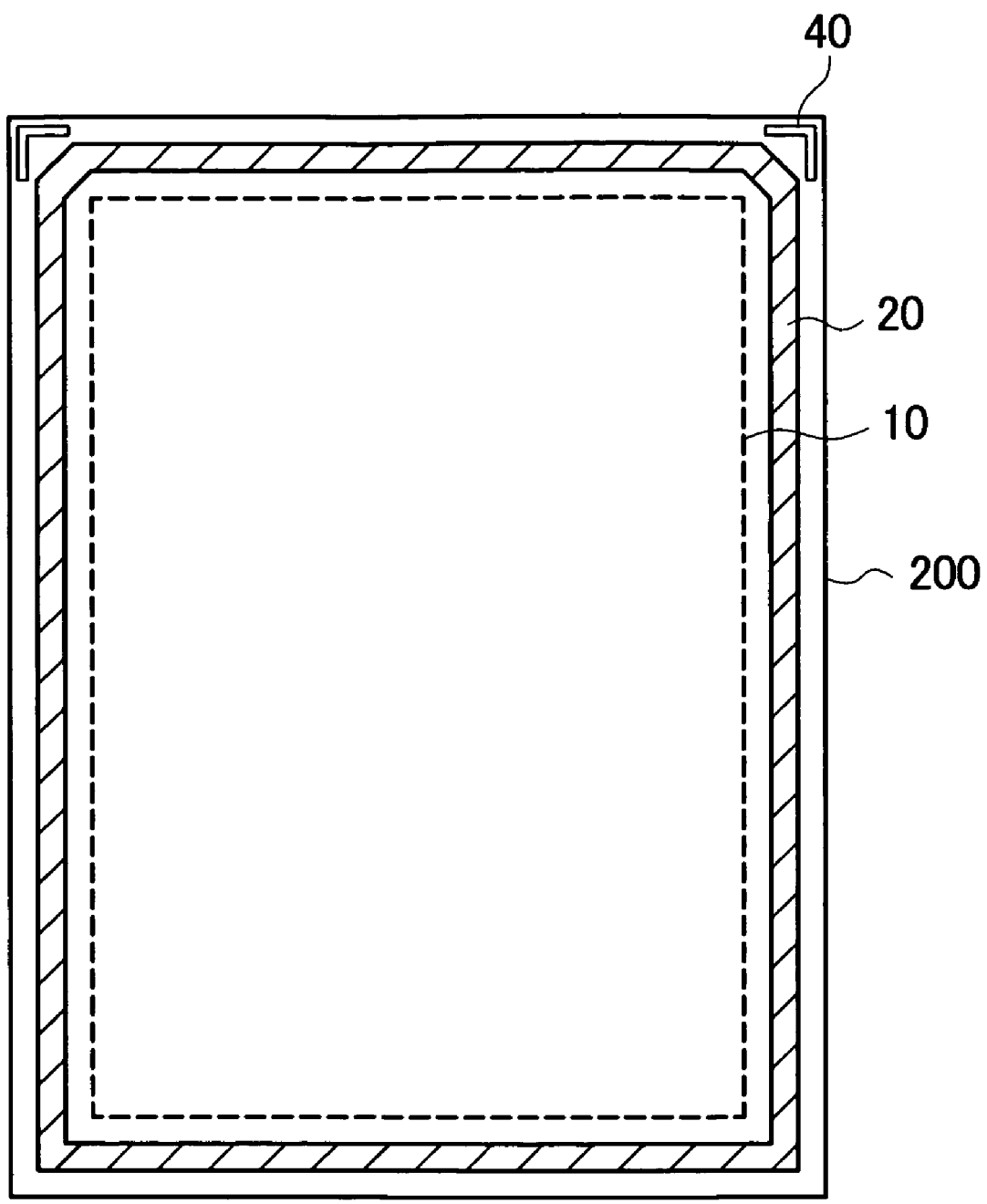
FIG. 7 is a plan view showing a case where a sealant is provided on a counter substrate.
Figure 8:
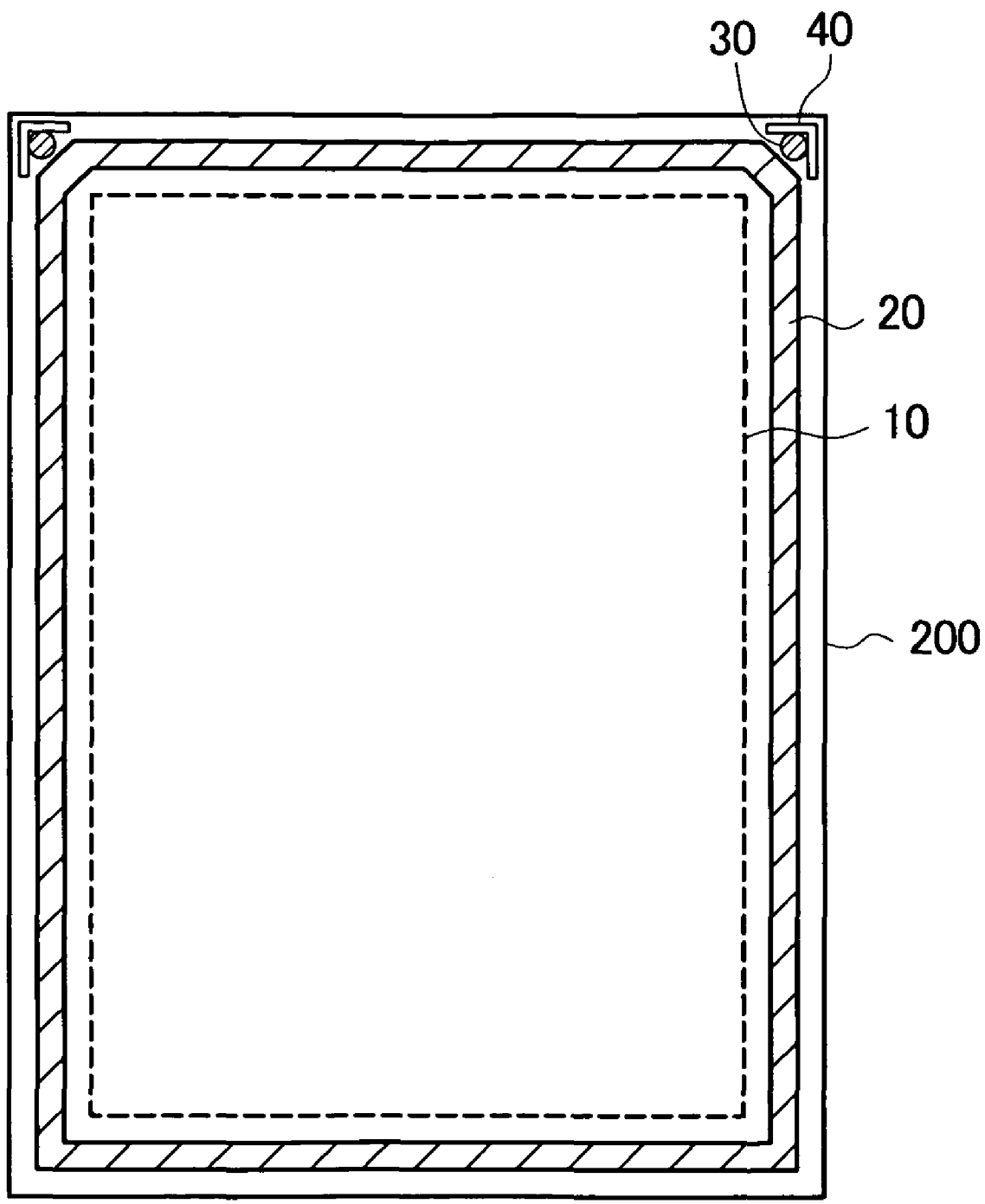
FIG. 8 is a plan view showing a case where a conductive paste is provided on a counter substrate.

FIGS. 6 to 8 are diagrams illustrating a process in which the L-shaped stoppers 40, the sealant 20, and the conductive pastes 30 are provided on the counter substrate 200. As shown in FIG. 6, first, the L-shaped stoppers 40 are individually provided at two corners of the counter substrate 200. The stoppers 40 are formed simultaneously with the columnar spacers 205 for defining the gap between the TFT substrate 100 and the counter substrate 200 in the display region 10. In FIG. 6, a portion surrounded by a dotted line is the display region 10, and the description of the display region 10 is omitted.

Next, as shown in FIG. 7, the sealant 20 is formed outside of the display region 10 by screen printing. The sealant 20 may be formed by a dispenser, but in terms of an accurate shape, it is preferably formed by screen printing. The sealant 20 is made of epoxy resin. In this embodiment, liquid crystal is dropped down on the counter substrate 200 by dropping, and thus the sealant 20 is continuously formed, as shown in FIG. 7. When liquid crystal is injected, an injection hole is formed in the sealant 20.

Next, the conductive paste 30 is dropped down between the sealant 20 and the L-shaped stopper 40 through nozzles. The amount of the conductive paste to be dropped down is accurately controlled. Since the conductive paste 30 is made of epoxy resin, screen printing may be used. However, when the sealant 20 is coated by screen printing, the conductive paste 30 is provided by using the nozzles, instead of screen printing.

Thereafter, liquid crystal is dropped down inside the sealant 20, and is sealed by bonding the counter substrate 200 and the TFT substrate 100 to each other. The sealant 20 is thermally cured. Since the sealant 20 is made of the same epoxy resin as the conductive paste 30, the sealant 20 and the conductive paste 30 are simultaneously cured on the same thermal curing condition.

As described above, according to the first embodiment of the invention, the stopper 40 is formed outside a portion where the conductive paste 30 is provided. Therefore, it is possible to reliably prevent the conductive paste 30 from flowing out of a predetermined region. In particular, in case of a small liquid crystal display in which the width of the frame is equal to or less than 1.5 mm, it is also possible to reliably the conductive paste 30 from flowing out. Furthermore, it is possible to simultaneously form the stoppers 40 and the columnar spacer 205 in the display region 10, and thus it is possible to suppress an increase in manufacturing costs.

Second Embodiment

Figure 9:
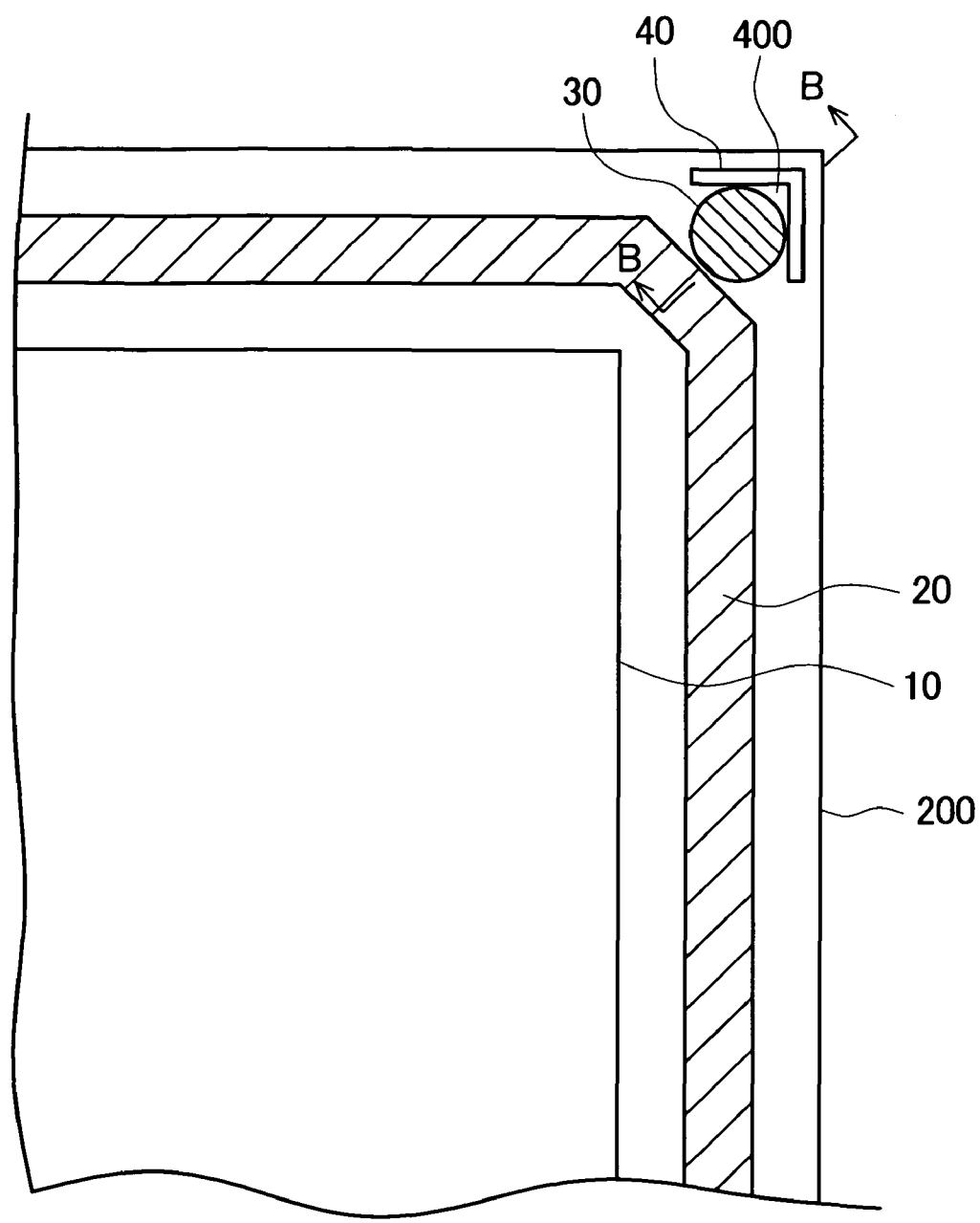
FIG. 9 is a plan view illustrating the object of a second embodiment of the invention.

FIG. 9 is a plan view illustrating a problematic phenomenon in the structure of the first embodiment. FIG. 9 is the same as FIG. 2 of the first embodiment, but it shows an example where air 400 exists between the stopper 40 and the conductive paste 30 at the corner. When the counter substrate 200 and the TFT substrate 100 are bonded to each other, air 400 may enter in the L-shaped stopper 40. In this case, the gap between the TFT substrate 100 and the counter substrate 200 may become unstable, and the conductive paste 30 may be not in close contact with the TFT substrate 100 and the counter substrate 200, which may result in poor contact.

Figure 10:
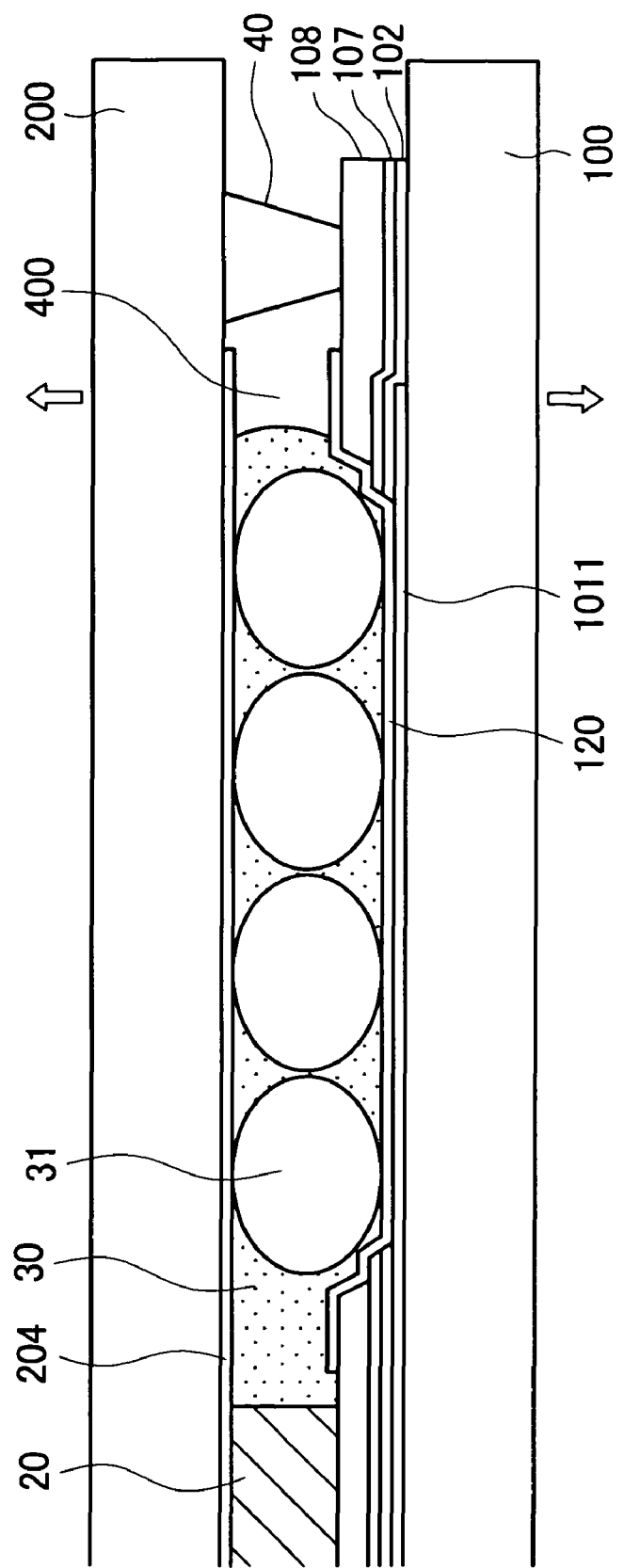
FIG. 10 is a sectional view illustrating the object of the second embodiment.

FIG. 10 is a sectional view taken along the line B-B of FIG. 9. The structure shown in FIG. 10 is the same as that shown in FIG. 4. In FIG. 10, however, air 400 exists between the stopper 40 and the conductive paste 30. The sealant 20 or the conductive paste 30 is made of epoxy-based thermosetting resin. When the counter substrate 200 and the TFT substrate 100 are bonded to each other, and the sealant 20 or the conductive paste 30 is thermally cured, air 400 near the stopper 40 is expanded, the TFT substrate 100 and the counter substrate 200 are pushed in a direction indicated by an arrow in FIG. 10. Accordingly, the gap between the TFT substrate 100 and the counter substrate 200 becomes unstable, and then electrical connection by the conductive beads 31 in the conductive paste 30 becomes unstable. For this reason, it is necessary to prevent air 400 from being confined within the stopper 40.

Figure 11:
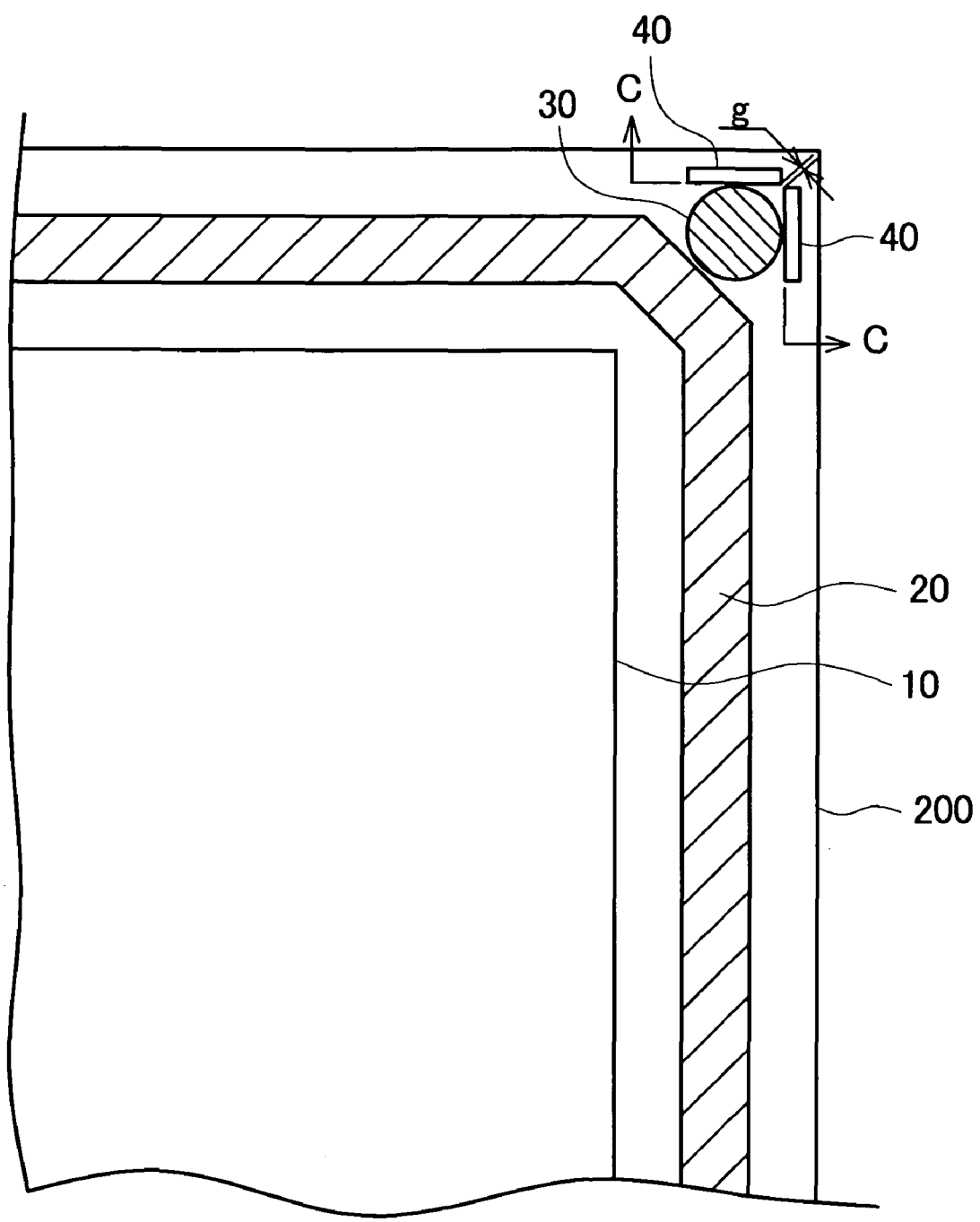
FIG. 11 is a plan view showing a liquid crystal display according to the second embodiment.

FIG. 11 is a plan view showing a corner of a liquid crystal display according to this embodiment. In FIG. 11, the stopper 40 does not have an L shape, and has a first bar-shaped stopper 40, which is formed along a short-side corner of the counter substrate 200, and a second bar-shaped stopper 40, which is formed along a long-side corner of the counter substrate 200. That is, a corner of an L-shaped stopper 40 is cut out.

The bar-shaped stoppers 40 have the same shape as that of each side of the L-shaped stopper 40. That is, each of the bar-shaped stoppers 40 is a length of 0.5 mm and a width of 10 μm. The height of the bar-shaped stopper 40 is 4 μm. This is because the bar-shaped stoppers 40 are formed by the same process as that of the columnar spacers 205 in the display region 10.

In FIG. 11, air 400 may be escaped through a gap g between the first bar-shaped stopper 40 and the second bar-shaped stopper 40 at the corner. Therefore, it is possible to avoid a phenomenon that air 400 is confined inside when the L-shaped stopper 40 is provided. In FIG. 11, the gap g at the cornet is small, and thus there is no case where the conductive paste 30 flows outward through the gap. This is because the conductive paste 30 has high viscosity and large surface tension.

Figure 12:
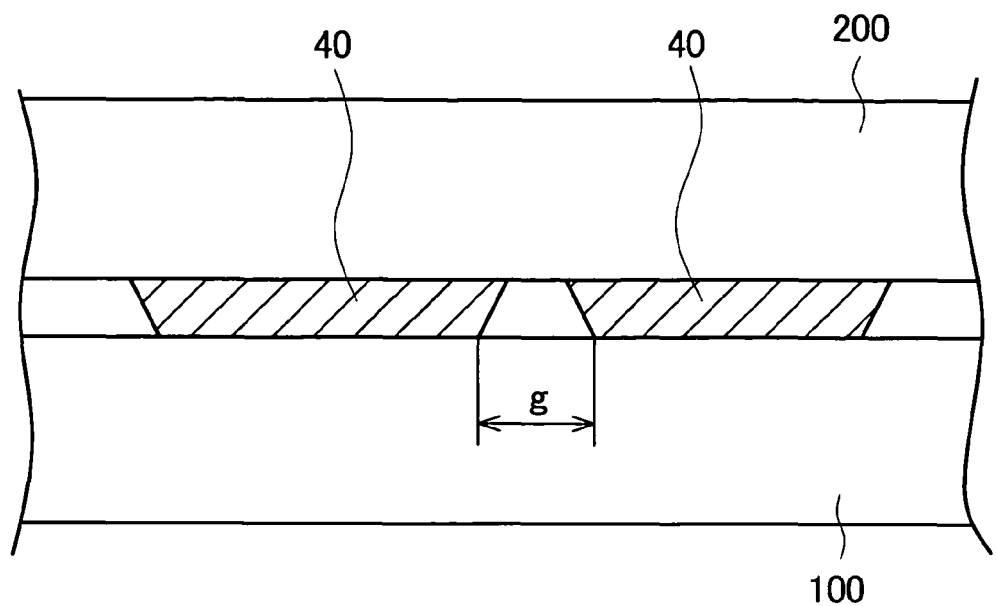
FIG. 12 is a sectional view of a stopper according to the second embodiment.

FIG. 12 is a sectional view taken along the line C-C of FIG. 11. In FIG. 12, the gap g between the bar-shaped stoppers 40 in FIG. 11 is defined. Referring to FIG. 12, the common wiring line 1011, the gate insulating layer 102, the inorganic passivation layer 107, the organic passivation layer 108, and the ITO layer formed on the TFT substrate 100, and the counter electrode 204 formed on the counter substrate 200, are not shown.

In FIG. 12, the bar-shaped stoppers 40 are formed by the same process as the columnar spacer 205 in the display region 10. That is, the bar-shaped stoppers are formed by applying acrylic resin on the entire surface of the counter substrate 200 and executing exposure and development. Therefore, the width of each of the bar-shaped stoppers 40 on the counter substrate 200 is larger than that on the TFT substrate 100. As shown in FIG. 12, the gap g between the bar-shaped stoppers 40 is a gap on the TFT substrate 100.

The size of the gap g is an important factor. If the gap g is excessively large, the conductive paste 30 flows outward, and if the gap g is excessively small, internal air 400 may not be sufficiently escaped. In order to prevent the conductive paste 30 from flowing outward, the gap g needs to be equal to or less than 100 μm, and preferably 50 μm. In order to prevent air 400 from being confined inside, the gap g needs to be equal to or more than 5 μm.

As described above, according to this embodiment, the bar-shaped stoppers 40 are provided at the corner, and thus it is possible to prevent air 400 from being confined inside. As a result, it is possible to reliably electrically connect the TFT substrate 100 and the counter substrate 200.

Third Embodiment

Figure 13A:
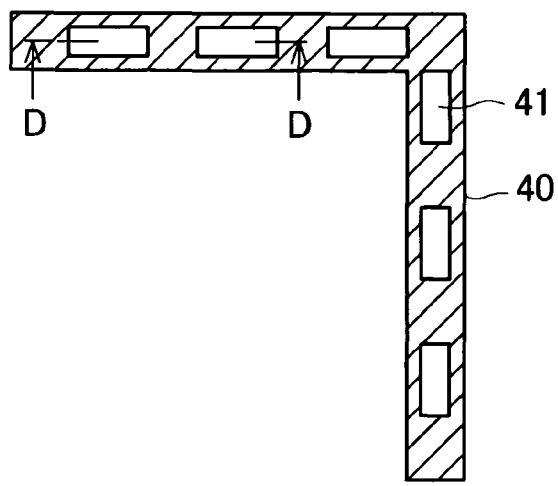
FIGS. 13A and 13B show the shape of a stopper according to a third embodiment of the invention.
Figure 13B:
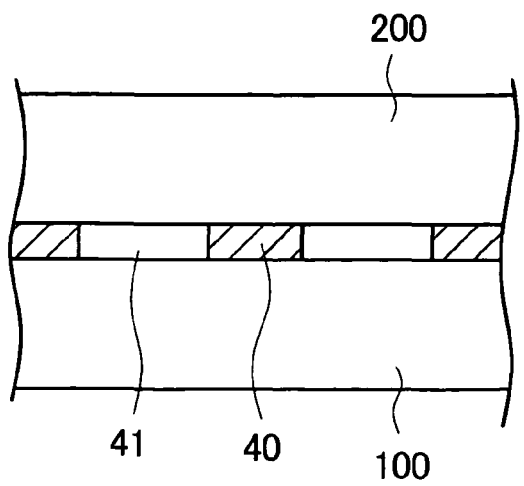

FIGS. 13A and 13B show examples of a stopper 40 according to a third embodiment of the invention. In this embodiment, a stopper 40 is provided at a corner of the counter substrate 200, and substantially has an L shape. However, the section is not uniform but uneven. Referring to FIG. 13A, the stopper 40 has concave portions 41. FIG. 13B is a sectional view taken along the line D-D of FIG. 13A. The concave portions 41 shown in FIGS. 13A and 13B have no special significance, but indicate that even if the stopper 40 has an uneven surface not a flat surface, it is possible to achieve the effect of the stopper 40 for stopping the conductive paste 30.

Figure 14:
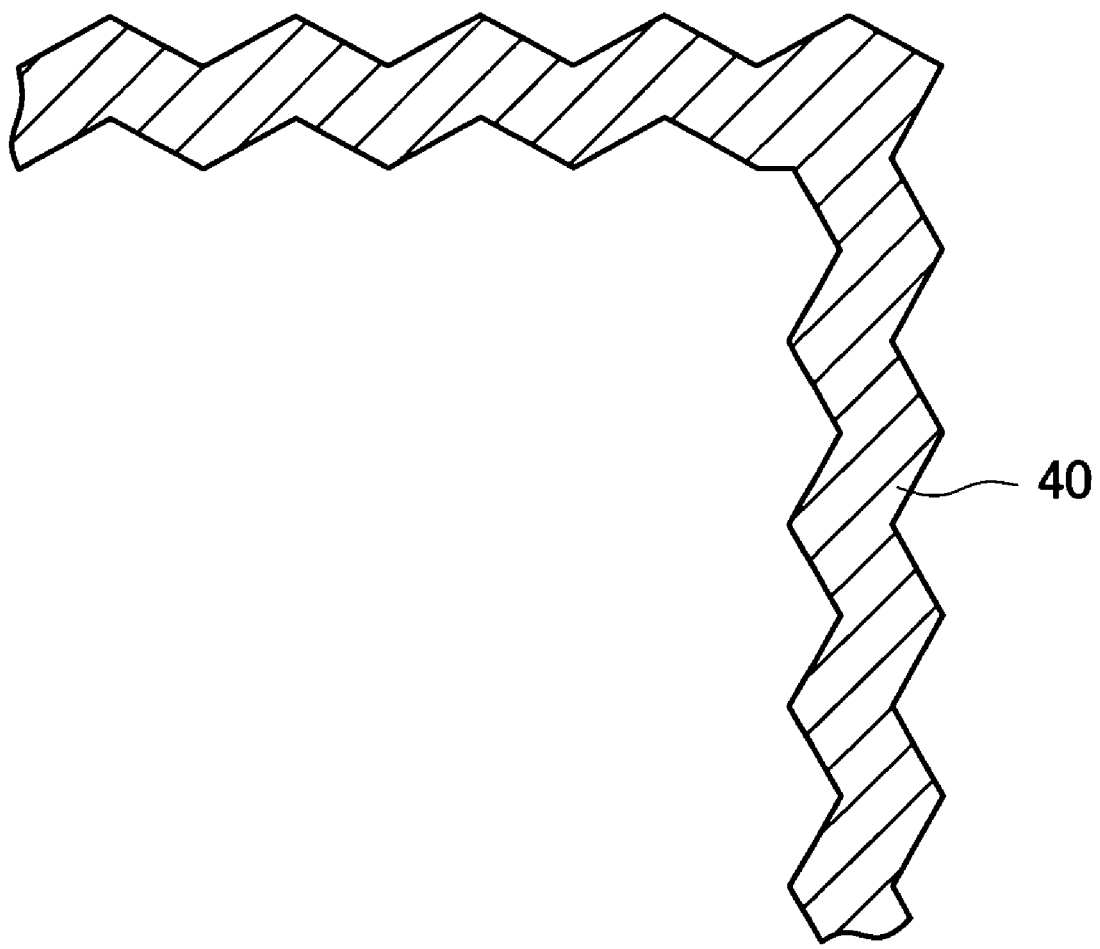
FIG. 14 shows the shape of a stopper according to the third embodiment.

FIG. 14 shows another example of the third embodiment. In FIG. 14, it is assumed that a stopper 40 is provided at a corner of the counter substrate 200. And, the stopper 40 shown in FIG. 14 substantially has an L shape. In FIG. 14, each side of the L-shaped stopper 40 has a saw-toothed shape. With the saw-toothed sides, even though the viscosity of the conductive paste 30 is small, it is difficult for the conductive paste 30 to flow outward. Even though each side has a saw-toothed shape, the sectional width of the stopper 40 is 10 μm, and thus the stopper 40 occupies a negligible area in the frame portion. Like this embodiment, even though the planar shape of the stopper 40 is irregular, it is possible to achieve the effect of the stopper 40.

In the foregoing embodiments, the TFT structure in the display region 10, in which a-Si is used as the semiconductor layer 103 and the gate electrode 101 is provided below the semiconductor layer 103, that is, a bottom gate-type TFT is used. However, the invention is not limited to the embodiments. For example, the invention may be applied to a TFT structure in the display region 10, in which poly-Si is used for a semiconductor layer 103, and a gate electrode 101 is provided above the semiconductor layer 103, that is, a top gate-type TFT.

Although in the foregoing embodiments, the display region 10 of the liquid crystal display is for transmissive display in which light from the backlight is controlled, thereby forming an image, the invention is not limited thereto. For example, the invention may be applied to a case where the display region 10 is for reflective display in which external light is reflected, thereby forming an image. Of course, the invention may be applied to a transflective display device that performs transmissive display and reflective display.

What is claimed is:

1. A liquid crystal display device comprising:
   a TFT substrate that has a common wiring line for supplying a common voltage;
   a counter substrate that has a counter electrode, to which the common voltage is supplied;
   a sealant that bonds the TFT substrate and the counter substrate to each other; and
   liquid crystal that is sealed between the TFT substrate, the counter substrate, and the sealant,
   wherein the counter substrate has a display region and a frame region, and a width of the frame region is defined by a distance from a side determining an end of the display region to an end of the counter substrate, and
   the common wiring line of the TFT substrate and the counter electrode of the counter substrate are electrically connected by a conductive paste, the conductive paste is formed outside the sealant, and a stopper is formed on the counter substrate outside the conductive paste to prevent the conductive paste from flowing outward.

2. The liquid crystal display device according to claim 1, wherein the stopper is provided at two corners of the counter substrate.

3. The liquid crystal display device according to claim 1, wherein the stopper has an L shape.

4. The liquid crystal display device according to claim 1, wherein the sealant is made of epoxy resin, and the conductive paste is formed by conductive beads in epoxy resin.

5. The liquid crystal display device according to claim 1, wherein the width of the frame region is equal to or less than 1.5 mm.

6. A liquid crystal display device comprising:
   a TFT substrate that has a common wiring line for supplying a common voltage;
   a counter substrate that has a counter electrode, to which the common voltage is supplied;
   a sealant that bonds the TFT substrate and the counter substrate to each other; and
   liquid crystal that is sealed between the TFT substrate, the counter substrate, and the sealant,
   wherein the counter substrate has a display region and a frame region, and a width of the frame region is defined by a distance from a side determining an end of the display region to an end of the counter substrate,
   the counter substrate has long and short sides,
   the common wiring line of the TFT substrate and the counter electrode of the counter substrate are electrically connected by a conductive paste, the conductive paste is formed outside the sealant, and a stopper is formed on the counter substrate outside the conductive paste to prevent the conductive paste from flowing outward, and
   the stopper has a first stopper that is provided along a long-side corner of the counter substrate, and a second stopper that is provided along a short-side corner of the counter substrate, and a gap between the first stopper and the second stopper is in a range of 100 µm to 5 µm.

7. The liquid crystal display device according to claim 6, wherein the gap between the first stopper and the second stopper is in a range of 50 µm to 5 µm.

8. The liquid crystal display device according to claim 6, wherein the first stopper and the second stopper have a bar shape.

9. The liquid crystal display device according to claim 6, wherein the stopper is provided at two corners of the counter substrate to prevent the conductive paste from flowing outward.

10. The liquid crystal display device according to claim 6, wherein the width of the frame region is equal to or less than 1.5 mm.

11. A liquid crystal display device comprising:

a TFT substrate that has a common wiring line for supplying a common voltage;

a counter substrate that has a counter electrode, to which the common voltage is supplied;

a sealant that bonds the TFT substrate and the counter substrate to each other; and liquid crystal that is sealed between the TFT substrate, the counter substrate, and the sealant, wherein the counter substrate has a display region and a frame region, and a width of the frame region is defined by a distance from a side determining an end of the display region to an end of the counter substrate, in the display region, a columnar spacer is formed on the counter substrate to define a gap between the TFT substrate and the counter substrate, the common wiring line of the TFT substrate and the counter electrode of the counter substrate are electrically connected by a conductive paste, the conductive paste is formed outside the sealant, and a stopper is formed on the counter substrate outside the conductive paste to prevent the conductive paste from flowing outward, and the stopper and the columnar space are made of the same material.

12. The liquid crystal display device according to claim 11, wherein the stopper and the columnar spacer are formed by the same process.

13. The liquid crystal display device according to claim 11, wherein the stopper and the columnar spacer have the same height.

14. The liquid crystal display device according to claim 11, wherein the width of the frame region is equal to or less than 1.5 mm.

* * * * *